United States Patent [19]

Kivela

[11] Patent Number: 5,918,189
[45] Date of Patent: Jun. 29, 1999

[54] EXCHANGEABLE HARDWARE MODULE FOR RADIOTELEPHONE

[75] Inventor: Seppo Kalervo Kivela, Salo, Finland

[73] Assignee: Nokia Mobile Phones, Ltd., Salo, Finland

[21] Appl. No.: 08/723,015

[22] Filed: Sep. 30, 1996

[51] Int. Cl.[6] ....................................................... H04B 1/38
[52] U.S. Cl. ........................... 455/575; 455/90; 455/101; 455/129; 455/277.1; 343/700 MS; 343/702
[58] Field of Search ............................... 455/575, 90, 562, 455/550, 73, 74, 78, 80, 82, 83, 100, 101, 128, 129, 272, 274, 277.1, 344, 347, 348, 349; 343/702, 700 MS, 895; 379/433, 428

[56] References Cited

U.S. PATENT DOCUMENTS

| 4,829,591 | 5/1989 | Hashimoto et al. | 455/277.1 |
|---|---|---|---|
| 5,210,532 | 5/1993 | Knoedler et al. | 340/825.69 |
| 5,251,329 | 10/1993 | Takagi et al. | 455/89 |
| 5,265,158 | 11/1993 | Tattari | 379/433 |
| 5,276,920 | 1/1994 | Kuisma | 455/101 |
| 5,504,494 | 4/1996 | Chatzipetros et al. | 343/702 |
| 5,555,459 | 9/1996 | Kraus et al. | 343/702 |
| 5,697,070 | 12/1997 | Liebler | 455/90 |

FOREIGN PATENT DOCUMENTS 0 521 609 A2  1/1993  European Pat. Off. .

OTHER PUBLICATIONS

I.J. Bahl et al., *Microstrip Antennas*, pp. 2–7, 24 and 25, published by Artech House, Inc., Dedham, MA, 1980.

*Primary Examiner*—Wellington Chin
*Assistant Examiner*—Lee Nguyen
*Attorney, Agent, or Firm*—Perman & Green, LLP

[57] ABSTRACT

A mobile telephone adaptable to a variety of specialized capabilities comprises a main unit and a plurality of accessory units, each capable of a different specialized function, each being selectively attachable to the main unit. The main unit has a contoured outer surface and an operating system for operation of the mobile telephone and each accessory unit includes a casing having a contoured outer surface containing specialized electronic components. The casing is selectively releasably attachable to the main unit which, when attached to the main unit, generally conforms to the outer surface of the main unit and lies generally within the profile of the main unit when attached to it. Interface contacts on the main unit and on the accessory unit are mutually engageable when the accessory unit is attached to the main unit for electrically interconnecting the specialized electronic components with the operating system. An attachment device is fixed on the outer surface of the casing for releasable attachment to an article of clothing worn by a user. The interface contacts include an antenna interface, an internal data bus, a battery power interface, and a regulated power interface. The accessory units may include an alarm system, a helical antenna with or without a complementary whip antenna, a flat profile antenna with or without a complementary whip antenna, a dual band antenna with or without filtering, a diversity antenna, and an accessory battery module.

25 Claims, 7 Drawing Sheets

FIG. 1.

PRIOR ART

FIG. 2.

PRIOR ART

FIG. 3.

PRIOR ART

EXCHANGEABLE HARDWARE MODULE FOR RADIOTELEPHONE

BACKGROUND OF THE INVENTION

1. Field of the Invention

This invention relates generally to a mobile radio telephone and, more particularly, to a mobile telephone of modular design comprising a main unit and a detachable accessory unit adaptable to a variety of specialized capabilities.

2. Description of the Prior Art

It is known to provide radio telephones comprised of separate modules. For example, in European Application No. EP 521,609 published Jan. 7, 1993, entitled "Radio Phone Composable of Separate Modules", a radio telephone capable of dual-mode operation comprises a basic module including circuitry common to the operation of the telephone in both modes, a first supplementary module including circuitry for processing signals characteristic of a first mode of operation, and a second supplementary module including circuitry for processing signals characteristic of a second mode of operation. With this construction, at least one of the modules is detachably coupled to the basic module so that the telephone is operable in the first and/or second modes according to which of the first and second supplementary modules is coupled to the basic module.

Although this is a desirable arrangement, known systems do have a number of drawbacks. For example, in the instance of a vibrating module being fitted to the base phone, this would not be desirable to customers who does not need it, yet they would be required to pay for such a module. Undesirably, also, such a module also makes the phone heavier. Further, if the vibrating module is fitted inside the phone, customers would be required to visit a repair shop to have the module installed, adding to the expense. Yet again, if the vibrating module is part of the battery pack, it would be necessary to dispose of it with the battery when the battery fails, again being costly for the user.

It was in light of the foregoing that the present invention was conceived and has now been reduced to practice.

SUMMARY OF THE INVENTION

The present invention relates to a mobile telephone adaptable to a variety of specialized capabilities. It comprises a main unit and a plurality of accessory units, each capable of a different specialized function, and being selectively attachable to the main unit. The main unit has a contoured outer surface and an operating system for operation of the mobile telephone and each accessory unit includes a casing having a contoured outer surface containing specialized electronic components. The casing is selectively releasably attachable to the main unit which, when attached to the main unit, generally conforms to the outer surface of the main unit and lies generally within the profile of the main unit when attached to it. Interface contacts on the main unit and on the accessory unit are mutually engageable when the accessory unit is attached to the main unit for electrically interconnecting the specialized electronic components with the operating system. An attachment device is fixed on the outer surface of the casing for releasable attachment to an article of clothing worn by a user. The interface contacts include an antenna interface, an internal data bus, a battery power interface, and a regulated power interface. The accessory units may include an alarm system, a helical antenna with or without a complementary whip antenna, a flat profile antenna with or without a complementary whip antenna, a dual band antenna with or without filtering, a diversity antenna, and an accessory battery module.

All of the aforementioned disadvantages of known systems are avoided in the present invention. An initial concept was to supply the back cover of a mobile phone with belt fixing means and simultaneously attach also the vibrating module to the back cover. In such an arrangement, the back cover is attached to the base of the phone with "snap in" devices or by using such attaching devices that the user of the phone can change the module, as in the instance of the like battery pack. If a tool is needed, it should be a "standard tool", perhaps a coin. The attaching devices of the module can be hidden by the battery pack, so it is not possible to remove the module accidentally.

A further advantage recognized by the inventor is that vibration is conducted to the user's body more effectively when the vibrating module is fixed directly to the belt fixing means. A particular feature of the invention is that this same "belt fixing means" can be integral with a common accessory unit. This arrangement can be especially desirable for antenna constructions that require a lot of space.

Because the accessory unit lies generally within the profile of the main unit, i.e. the dimensions of the phone do not change, there are no problems when using a "mobile holder" (for car installation), "desktop charger", "carrying bag", and the like.

Also, with the invention, there is no need for the user to open the phone in order to change the module. Nor does changing the module increase the size of the phone, that is make it longer, wider or thicker. Additionally, no cables or remote links are necessary. Further, the same mechanical part can carry all the accessories although, as will be seen, the dual antenna unit may need some minor modifications. In general, the same mechanical part can be used for phones for different cellular systems that need different antennas.

Accordingly, a primary object of the present invention is to provide a mobile phone of modular design comprising a main unit and a detachable accessory unit adaptable to a variety of specialized capabilities.

Another object of the present invention is to provide such a phone comprising a main unit having a contoured outer surface and including an operating system for operation of the mobile telephone, an accessory unit including a casing having a contoured outer surface and containing specialized electronic component means, the casing being selectively releasably attachable to said main unit which, when attached to said main unit, generally conforms to said outer surface of the main unit and lies generally within the profile of said main unit when attached thereto, interface contacts on the main unit and on the accessory unit mutually engageable when the accessory unit is attached to the main unit for electrically interconnecting the specialized electronic component means with the operating system, and attachment devices fixed on the outer surface of the casing for releasable attachment to an article of clothing worn by a user.

A further object of the present invention is to provide such a mobile phone wherein the interface contacts include an antenna interface, an internal data bus, a battery power interface, and a regulated power interface.

Still another object of the invention is to provide such a mobile phone wherein the accessory units may include, variously, an alarm system, a helical antenna with or without a complementary whip antenna, a flat profile antenna with or without a complementary whip antenna, a dual band antenna with or without filtering, a diversity antenna, and an accessory battery module.

Yet a further object of the present invention is to provide such a mobile phone in which the accessory module is be located up and back of the phone, that is, opposite the earpiece, to provide for the antenna and vibration modules incorporating the belt clip mounting arrangement.

Yet another object of the invention is to provide such a modular mobile phone with suitable interfaces, in one instance, at least means to connect an accessory to the antenna terminal(s) of the main body of the phone, when using antenna accessory and, in another instance, means to connect the accessory module to the data bus of the main body of the phone and means to connect the accessory to the power supply of the main body, when using the vibratory module.

Still a further object of the invention is to provide such a modular mobile phone such that joining the accessory module to the phone does not make the phone substantially larger, nor require adapters or cables.

Still a further object of the invention is to provide such a modular mobile phone for which joining or changing the accessory is similar to replacing the battery pack, something the user can do without opening the covers of the phone and without special tools.

Still a further object of the invention is to provide such a modular mobile phone which includes means to recognize that the module is added, perhaps automatically by means of the data bus or power supply interface or manually by the user using a menu and keyboard.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENT

Figure 1:
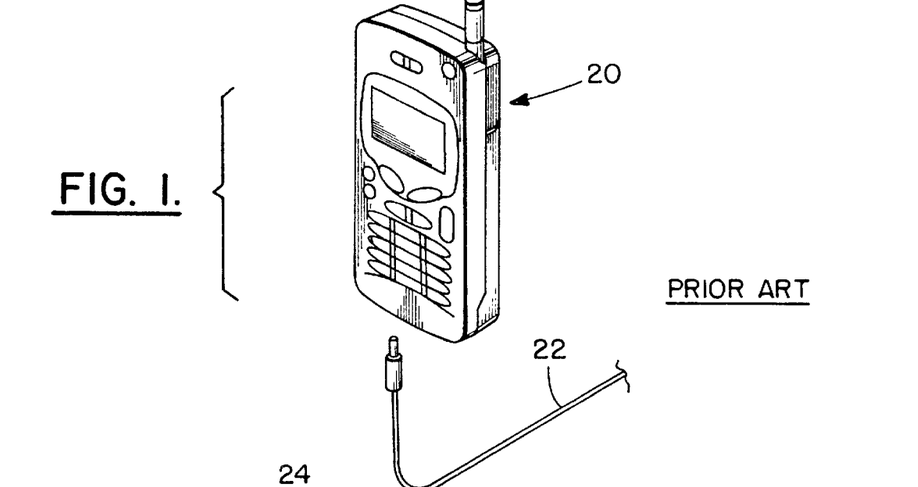
FIG. 1 is a perspective exploded view of a mobile telephone and accessory connection thereto.
Figure 2:
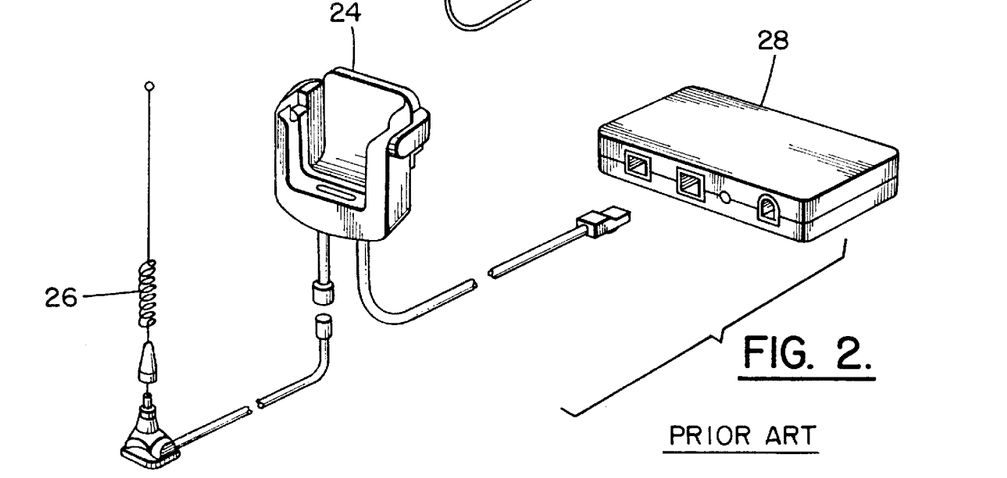
FIG. 2 is a perspective view of known constructions for attaching accessory components to a mobile telephone.
Figure 3:
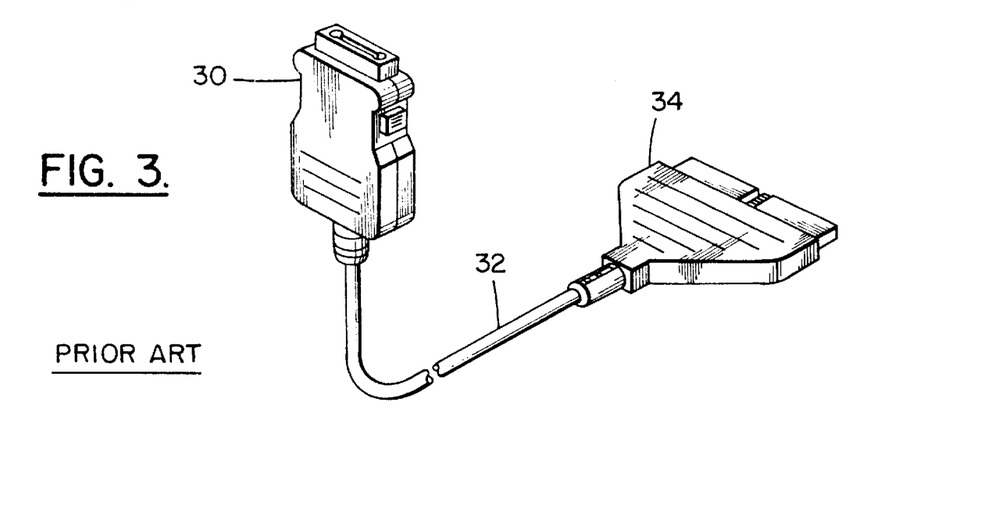
FIG. 3 is a perspective view of another known construction for attaching accessory components to a mobile telephone.

Turn now to the drawings and, initially, to FIG. 1 which generally illustrates that it is known to connect accessories (not shown) to the main unit of a modular phone 20 by means of a cable 22 connecting directly to the main unit. Viewing FIG. 2, such a connection can also be achieved using a holder 24 for engageable reception with the phone to connect accessories such as an alternate antenna 26 or a junction box 28 via which an external battery, hands free microphone, hands free speaker, and the like can be connected to the main unit. Another typical arrangement is illustrated in FIG. 3. In this instance, a first connector 30 can be releasably joined to the modular phone 20 and extends, via a cable 32 to a second connector 34 adapted to be joined to another device (not shown) such as a power booster, that is, an external amplifier to produce higher transmitted power.

Figure 4:
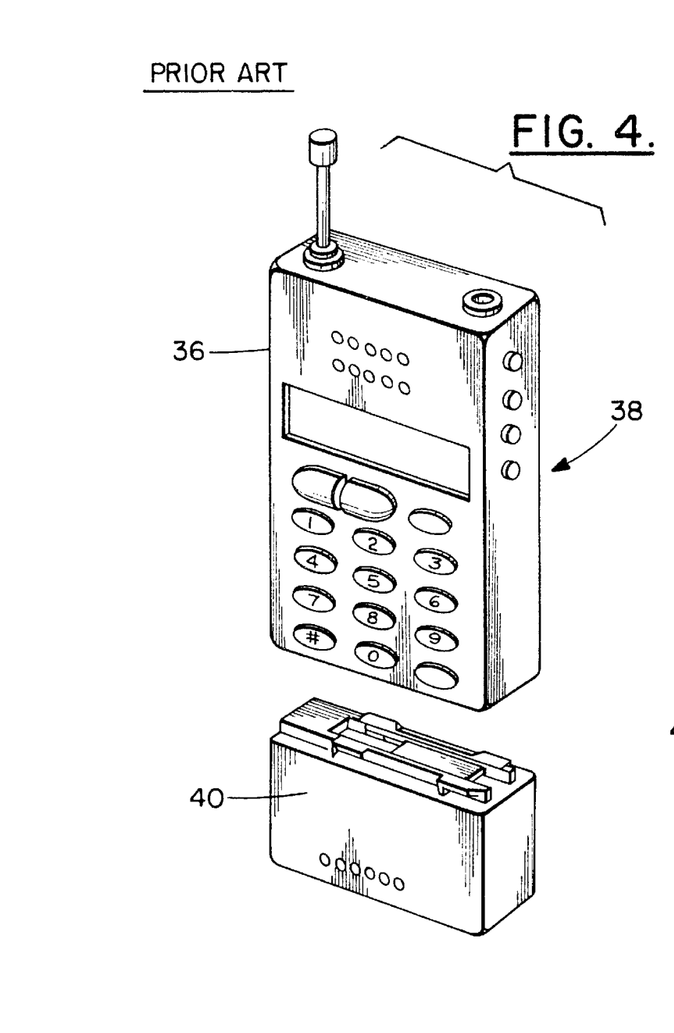
FIG. 4 is a perspective view of a known combination of mobile telephone and directly attachable accessory component.
Figures 5A, 5B:
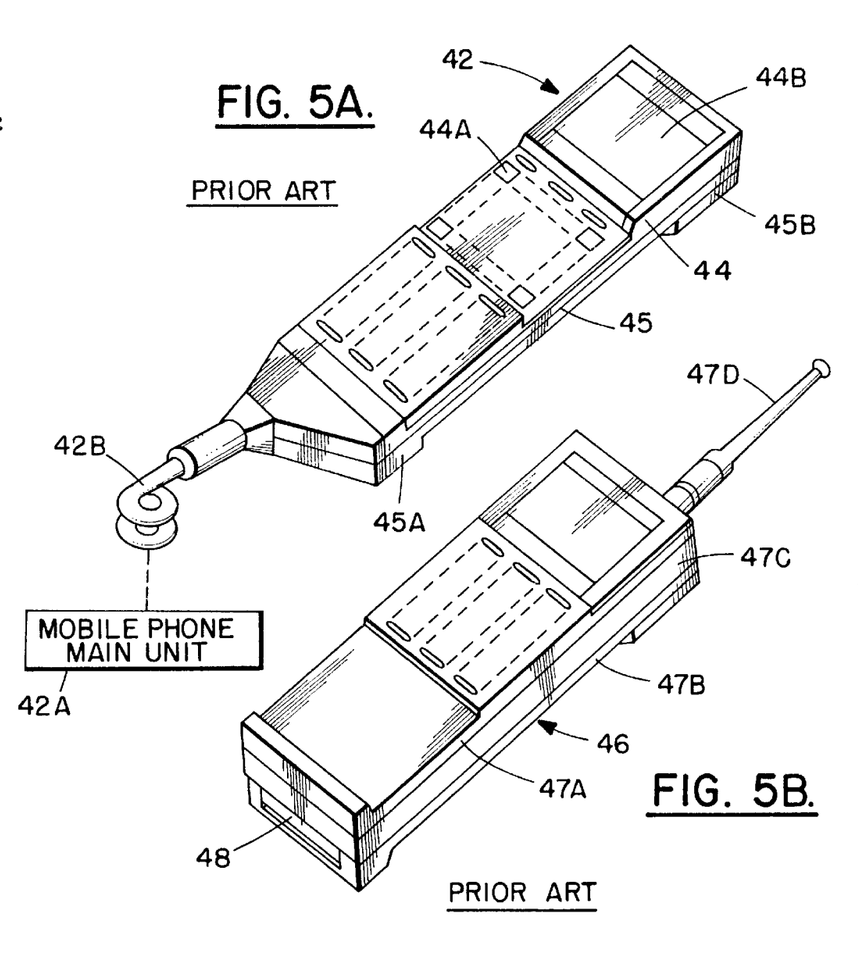
FIGS. 5A and 5B are perspective views, respectively, of other known combinations of telephone units and directly attachable accessory components.

FIGS. 4 and 5 disclose "modular" constructions which enlarge the size of the main unit. For example, in FIG. 4, as disclosed in U.S. Pat. No. 5,251,329 to Takagi et al., a main unit 36 of a modular phone 38 may be adapted to receive a supplemental module 40, such as an added battery pack, thereby substantially elongating the original phone. In a similar fashion, as disclosed in commonly assigned U.S. Pat. No. 5,265,158 to Tattari and illustrated in FIG. 5A, a handset 42 is provided for connection to a main unit 42A of a mobile phone with a spiral cord 42B. The handset 42 comprises an upper part 44 which may be suitably mechanically joined to a lower part 45. The upper part includes a key set 44A and a display 44B while the lower part includes a microphone 45A and an earphone 45B.

In similar fashion, viewing FIG. 5B, a stand-alone portable radio telephone unit 46 utilizes parts 47A and 47B, similar to parts 44, 45, respectively. Between these parts 47A, 47B is positioned in a sandwich fashion an intermediate body 47C which contains the rf-parts of the stand-alone unit, an antenna 47D, and a case for batteries. A connector 48 on part 47B allows the stand-alone unit to be connected, for example, to the main unit 42A of a mobile phone or to other auxiliaries.

Figures 6, 7, 8:
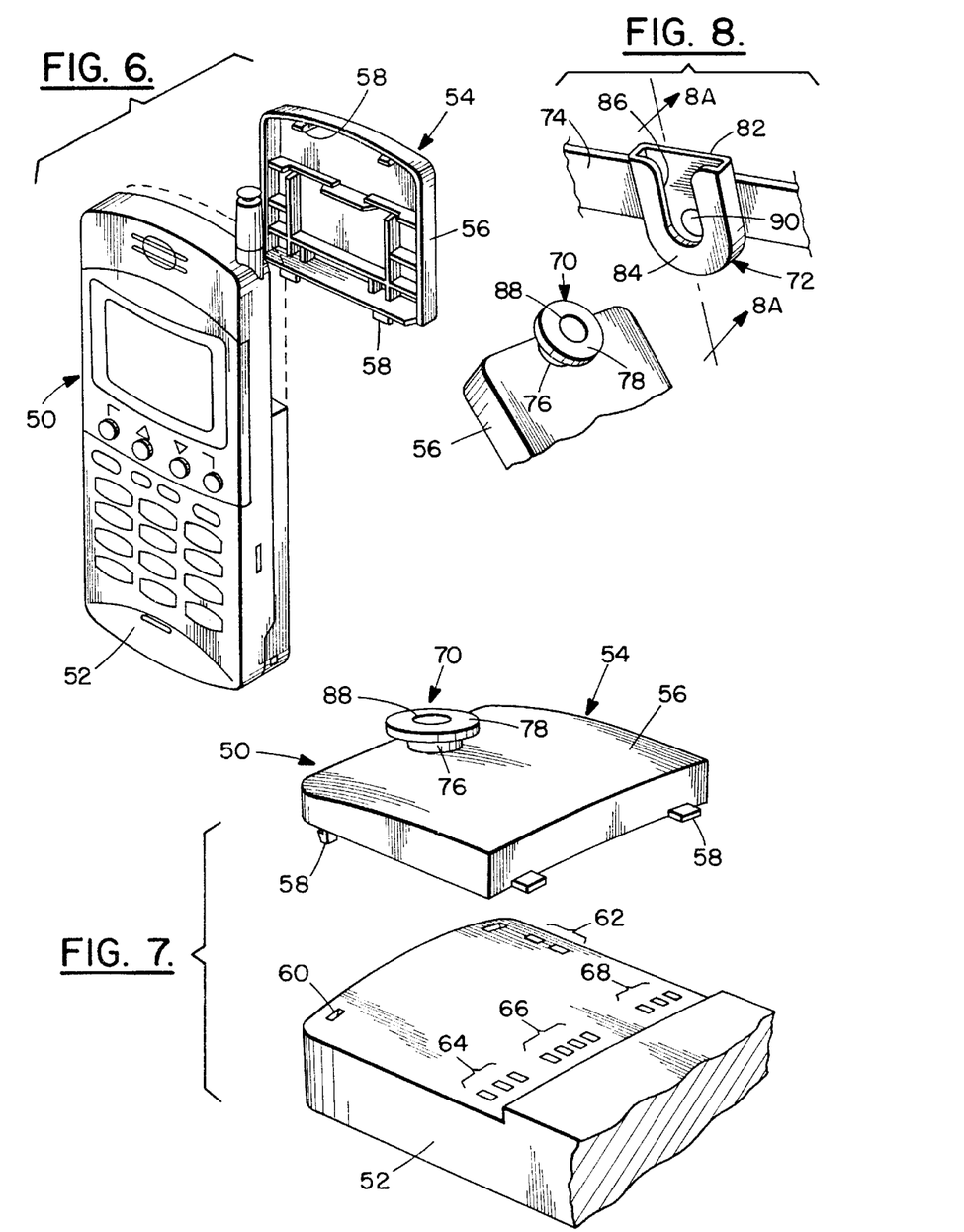
FIG. 6 is a perspective view of a combination of mobile telephone and directly attachable accessory component embodying the present invention.
FIG. 7 is a detail exploded perspective view of a portion of the invention illustrated in FIG. 6.
FIG. 8 is a detail exploded perspective view illustrating the construction for attaching the mobile telephone of the invention to clothing of the user.

Turn now to FIGS. 6 and 7 for a broad description of the invention. Specifically, viewing FIG. 6, a mobile telephone 50 is illustrated which is adaptable to a variety of specialized capabilities. It comprises a main unit 52 having a contoured outer surface and including an operating system for operation of the mobile telephone. An accessory unit 54 includes a casing 56 having a contoured outer surface and containing specialized electronic components. The casing 56 is selectively releasably attachable to the main unit 54 by means of suitable attachment devices 58 engageable with mating components 60 on the main unit. Preferably the attachment devices 58 and their mating components 60 are of the type which hold the parts firmly together, when engaged, but which can be readily releasable as by means of a simple tool such as a coin. When attached to the main unit, the outer surface of the accessory unit 54 generally conforms to the outer surface of the main unit 52 and lies generally within the profile of the main unit when attached thereto. Of course, it will be appreciated that the casing 56 may be, in fact, a "dummy" casing containing no components for an inexpensive, basic phone model. In this situation, the antenna would be fitted in the main unit 52 and a suitable hole may be provided for an antenna such as will be seen in some of the embodiments to be described below.

The mobil telephone 50 also includes interface contacts on the main unit 52 and on the accessory unit 54 which are mutually engageable when the accessory unit is attached to the main unit. These interface contacts which serve to electrically interconnect the specialized electronic components with the operating system of the main unit are most clearly shown in FIG. 7. They are illustrated as including an antenna interface 62, an internal data bus 64, a battery power interface 66, and a regulated power interface 68.

Figure 8A:
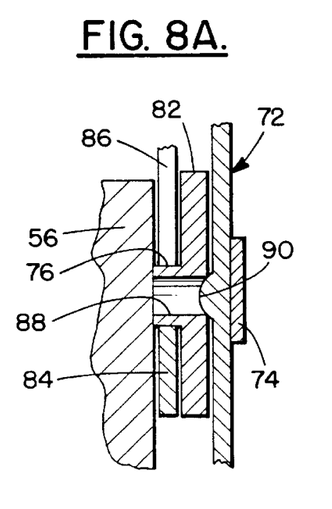
FIG. 8A is a detail cross section view taken generally along line 8A—8A in FIG. 8.

Viewing FIGS. 8 and 8A, mutually engageable attachment fixtures 70, 72 are provided, respectively, on the outer surface of the casing 56 and on an article of clothing, such as a belt 74 worn by a user, for releasable attachment of the mobile telephone 50 close to the body of the user. The attachment fixture 70 includes a post 76 integral with and projecting away from the surface of the casing 56. A peripheral flange 78 on the post is spaced from the casing 56 for inter-engaging reception with the attachment fixture 72 in the form of a mounting clip on the belt 74 or other article of clothing worn by the user. The mounting clip defines a hollow 82 and in its forward facing cover 84 is formed with a recess 86 for slidable reception of the post 76 even as the hollow 82 slidably receives the flange 78.

The post 76 has a central bore 88 adjacent the peripheral flange 78 for reception therein of a protuberance 90 on the mounting clip for normal retention of the post on the article of clothing worn by the user. It will be appreciated that the materials of which the attachment fixtures 70, 72 are composed are sufficiently resilient or yieldable to permit the protuberance 90 to enter the bore 88 and fittingly, yet removably, hold the fixture 70 in place on the fixture 72.

Figure 9:
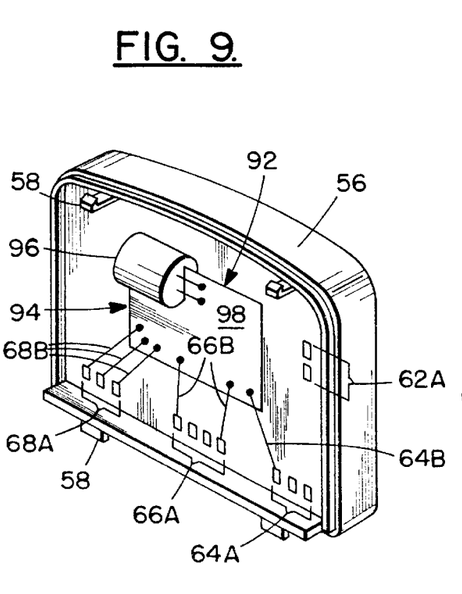
FIG. 9 is a detail perspective view of one specialized component of the invention capable of removable attachment to the main body of the mobile telephone of the invention.

In FIG. 9, a specialized component is illustrated in the form of an alarm system 92 for notifying the user of an occurring event. In this instance, the alarm system includes a vibratory module 94 suitably mounted on to the casing 56. An eccentric motor 96 is mounted on the vibratory module together with a motor control device 98 for operating the eccentric motor. Also indicated in FIG. 9 are an antenna interface 62A, an internal data bus 64A, a battery power interface 66A, and a regulated power interface 68A, all of which are engaged with their numbered counterparts on the main unit when the accessory unit 54 is attached thereon. Suitable leads 64B connect the internal data bus 64A to the motor control device 98; leads 66B connect the battery power interface 66A to the motor control device 98; and leads 68B connect the internal data bus 68A to the motor control device 98.

Thus, it is seen that the vibrating module 94 is fixed to the casing 56 of the accessory unit 54 so that there is a solid connection between the attachment fixtures 70, 72 and the eccentric motor. The motor control device obtains the supply voltage from the regulated power supply interface 68, 68A, the eccentric motor 96 obtains power from the battery power interface 66, 66A, and the vibrating commands are received from the data bus interface 64, 64A.

Figure 10:
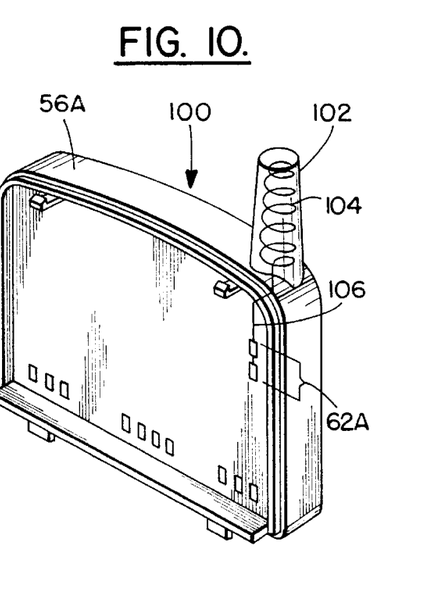
FIG. 10 is a detail perspective view of another specialized component of the invention capable of removable attachment to the main body of the mobile telephone of the invention.

In FIG. 10, a specialized component is seen to include a single antenna sheath 102 integral with a slightly modified casing 56A. The antenna sheath 102 projects away from the outer surface of the casing in a direction generally parallel to a longitudinal axis of the main unit 52 when the accessory unit 54 is attached thereto. It will be appreciated that the antenna sheath may be molded to the casing 56A or it may be of a removable construction. A helical antenna 104 is mounted within the antenna sheath 102 and generally aligned with the sheath.

An antenna interface 62A on the component 100 is in electrical continuity with the helical antenna 104 by means of an antenna lead 106 and is engaged with the antenna interface 62 on the main unit 52 when the accessory unit in the form of the specialized component 100 is attached to the main unit.

Figure 11:
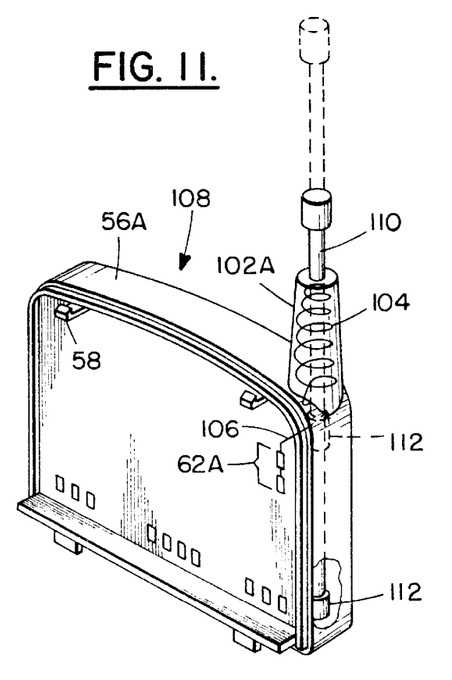
FIG. 11 is a detail perspective view of still another specialized component of the invention capable of removable attachment to the main body of the mobile telephone of the invention.

In FIG. 11, another specialized component 108 is seen to include a modified single antenna sheath 102A integral with the slightly modified casing 56A of the FIG. 10 construction. As with the component 100, the antenna sheath 102A projects away from the from the outer surface of the casing in a direction generally parallel to a longitudinal axis of the main unit 52 when the accessory unit 54 is attached thereto. In this instance, however, a retractable whip antenna 110 is concentrically aligned with the helical antenna 104 and is suitably mounted on the casing 56A for movement between a retracted position (solid lines) and an extended position (dashed lines). The whip antenna 110 includes a contact member 112 which is disengaged from the antenna lead 106 when the whip antenna is in the retracted position and engaged with the antenna lead when the whip antenna is in the extended position. Hence, it is seen that the helical antenna 104 is continuously in continuity with the antenna interface 62A contact. It is known to provide a mobile phone with either a helical antenna or with a combined helical/retractable whip antenna, and it is even known to provide such a construction without opening the phone and/or requiring a visit to a service facility to achieve the change. However, changes in presently known phones to achieve those antenna constructions to be described below are not, in the absence of using the present invention, capable of achievement without either opening the phone or visiting a service facility for that purpose.

Figure 12:
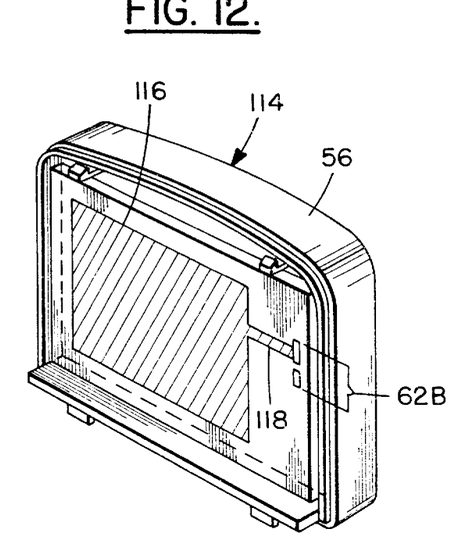
FIG. 12 is a detail perspective view of yet another specialized component of the invention capable of removable attachment to the main body of the mobile telephone of the invention.

In FIG. 12, another specialized component 114 in which a flat profile antenna 116 is suitably mounted on the casing 56 and is substantially coextensive with the length and width of the casing. The term "flat profile antenna" is intended to be common for all types of antennas that are thin and require a large area. These types of antennas may variously be referred to as microstrip antennas, patch antennas, stripline antennas, printed antennas, planar antennas, and PIFAs (Planar Inverted F-Antennas). An antenna interface 62B for the specialized component 114 is in electrical continuity with the flat profile antenna and is engageable with the antenna interface 62 on the main unit 52 when the casing 56 is attached to the main unit. An antenna lead 118 electrically connects the flat profile antenna 116 to the antenna interface.

The flat profile antenna 116 may be generally of the type described in pages 2–7, 24 and 25 of the text entitled "Microstrip antennas" by I. J. Bahl and P. Bhartia published in 1980 by Artech House, Inc. of Dedham, Md., USA. It will be appreciated that a common problem in using flat profile antennas in cellular telephones is that, to realize needed bandwidth (approximately 50 to 100 MHz) requires a comparatively large antenna. The construction illustrated in FIG. 12 offers a suitable location and a suitable area for such a flat profile antenna and offers the user of the phone the capability of changing from a standard helical antenna to a flat profile antenna with minimal effort.

Additionally, it is known that the standard bandwidth for a flat profile antenna is 1–5%. Further, almost 10% is needed for 900 MHz cellular systems. As a result, special designs requiring more space are needed to provide for the broader bandwidth. The accessory unit of the invention offers the additional space required for such special designs.

Figure 13:
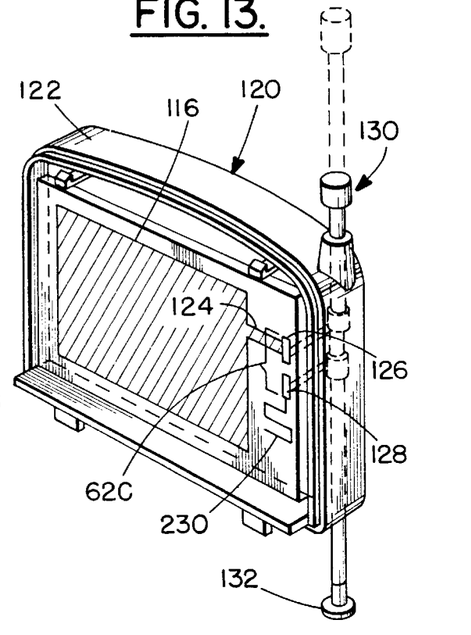
FIG. 13 is a is a detail perspective view of a further specialized component of the invention capable of removable attachment to the main body of the mobile telephone of the invention.
Figures 14A, 14B, 14C:
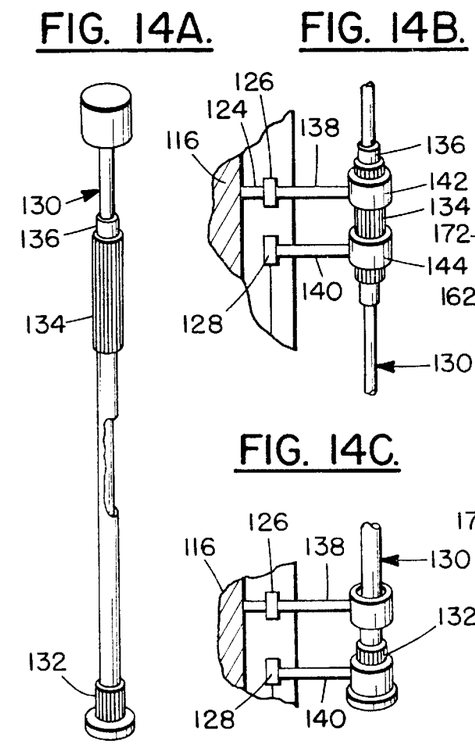
FIGS. 14A, 14B, and 14C are detail perspective views of a portion of FIG. 13, in the latter two instances, depicting two different positions of the parts thereof.

In FIG. 13, still another specialized component 120 is presented which is a variation of the component 114. In this instance, a flat profile antenna 116 is suitably mounted on a modified casing 122 so as to be substantially coextensive with the length and width of the casing. A flat profile antenna 124 lead electrically connects the flat profile antenna 116 to an antenna feed 126 such that the antenna feed is in electrical continuity with the flat profile antenna but disengaged from a whip antenna feed 128 when the casing 56 is attached to the main unit 52.

TABLE 1

Comparison of Various Flat Profile Printed Antennas

| Characteristic | Flat profile Antenna | Stripline Slot Antenna | Cavity Backed Printed Antenna | Printed Dipole Antenna |
| --- | --- | --- | --- | --- |
| Profile | Thin | Not very thin | Thick | Thin |
| Fabrication | Very easy | Easy | Difficult | Easy |
| Polarization | Both linear and circular | Linear | Both linear and circular | Linear |
| Dual Frequency Operation | Possible | Not possible | Not possible | Not possible |
| Shape Flexibility | Any shape | Only rectangular | Other shapes possible | Rectangular and triangular |

TABLE 1-continued

Comparison of Various Flat Profile Printed Antennas

| Characteristic | Flat profile Antenna | Stripline Slot Antenna | Cavity Backed Printed Antenna | Printed Dipole Antenna |
| --- | --- | --- | --- | --- |
| Spurious Radiation | Exists | Exists | Doesn't exist | Exists |
| Bandwidth | 1–5% | 1–2% | ~10% | ~10% |

In its simplest configuration as seen in Table 1 (taken from page 2), I. J. Bahl and P. Bharta, *Microstrip Antennas*, published by Artech House, Inc. 1980), the flat profile antenna 116 includes a radiating patch on one side of a dielectric substrate which has a ground plane on the other side. The patch conductors, normally of copper and gold, can assume virtually any shape, but conventional shapes are generally used to simplify analysis and performance prediction. Various types of substrates having a large range of dielectric constants and loss tangents have been developed. Flexible substrates are also available which make it possible to fabricate simple conformal wraparound antennas. Table 1 teaches that a standard flat profile antenna bandwidth is 1–5%. Almost 10% is needed for 900 MHz cellular systems and, special designs are needed to provide a broader bandwidth. Since special designs need more space, the accessory unit offers the additional space required for such special designs.

Flat profile antennas have several advantages compared to conventional microwave antennas and therefore many applications over the broad frequency range from ~100 MHz to ~50 GHz. Some of the principal advantages of flat profile antennas compared to conventional microwave antennas are:

lightweight, low volume, low profile planar configurations which can be made conformal low fabrication cost; readily amenable to mass production can be made thin the antennas may be easily mounted the antennas have low scattering cross section linear, circular (left hand or right hand) polarizations are possible with simple changes in feed position dual frequency antennas easily made no cavity backing required flat profile antennas are compatible with modular designs (solid state devices such as oscillators, amplifiers, variable attenuators, switches, modulators, mixers, phase shifters, etc. can be added directly to the antenna substrate board)

feed lines and matching networks are fabricated simultaneously with the antenna structure.

However, flat profile antennas also have some disadvantages compared to conventional microwave antennas including:

narrow bandwidth loss, hence somewhat lower gain most flat profile antennas radiate into a half plane.

A retractable whip antenna 130 is suitably mounted on the casing 56 for movement between a retracted (solid line) position and an extended (dashed line) position. The whip antenna 130 includes a first contact member 132 in electrical continuity with the whip antenna and a second contact member 134 on the whip antenna longitudinally spaced from the first contact member and electrically insulated from the whip antenna by dielectric material 136.

With the construction just described, viewing FIGS. 13, 14A, 14B, and 14C, the second contact member 134 is in electrical continuity simultaneously with the whip antenna feed 128 and with the flat profile antenna feed 126, via leads 138, 140, respectively, when the whip antenna is in the retracted position (see especially FIG. 14B) and the first contact member 132 is in electrical continuity with the whip antenna feed 128 alone when the whip antenna 130 is in the extended position.

Thus, when the whip antenna 130 is in the down or retracted position, the first contact member 132 short circuits the whip antenna feed 128 to the flat profile antenna feed 126 via annular contacts 142, 144 and the flat profile antenna is in use. When the whip antenna 130 is in up or extended position, the whip antenna feed 128 is in contact with the whip antenna, and the flat profile antenna is not in use.

Fifty ohms is an impedance "standard" commonly used in radio frequency circuits. External antennas and antenna cables typically have 50 ohm impedance. That is why the antenna port impedance for a radio phone is normally 50 ohms. Impedance on the antenna of the phone is not always 50 ohms; for instance 200 ohms is very common. To minimize losses, the antenna feeds 126, 128 and their associated antennas 116, 110 must have the same impedance. A matching circuit 230 is an "impedance transformer" to match together each antenna and its associated antenna feed with different impedances. In short, a matching circuit is needed to minimize losses if an antenna has a different impedance than its associated antenna feed.

Generally it is possible to provide a construction enabling the whip and flat profile antennas to function together. However, in practice this is a very difficult goal to realize. Antennas cannot merely be connected together. In practice, it is easier to design different antennas and then to switch between them.

It was earlier noted that a major advantage of a flat profile antenna resides in its thin construction but that a major disadvantage resides in its necessarily large area. It is difficult to replace a conventional whip or helical antenna with a flat profile antenna, because of the totally different shape of antennas. It is desirable to use a flat profile antenna or combination of flat profile and whip antennas because of the ability to fit a flat profile antenna fully inside the phone. An operable antenna is thereby provided even when the phone is placed in a pocket. For cordless phones operating always near the base station, this type of antenna (FIG. 12) is excellent. However, a long whip antenna is normally more effective than a flat profile antenna. For cellular phones operating far away from telephone base stations, there can be need to use a whip antenna.

The design of the invention thus provides the user with the ability of readily adjusting the mobile telephone 50 to his needs.

Figure 15:
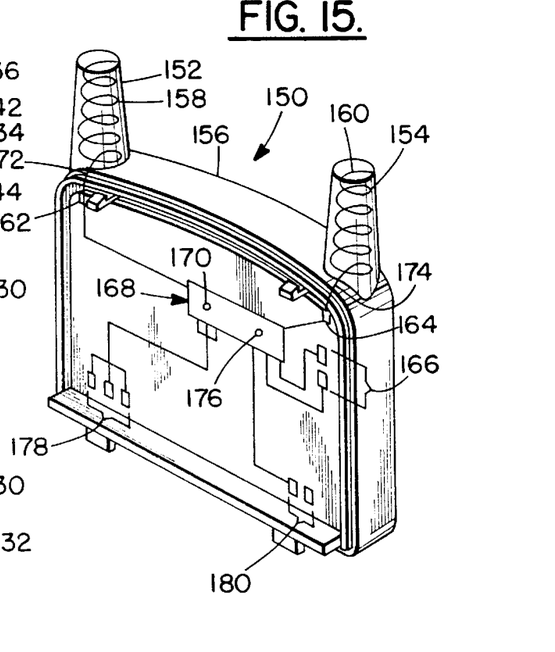
FIG. 15 is a detail perspective view of still a further specialized component of the invention capable of removable attachment to the main body of the mobile telephone of the invention.

In FIG. 15, still another specialized component 150 includes a pair of spaced antenna sheaths 152, 154 which are integral with a modified casing 156 and project in a direction away from the outer surface of the casing at spaced locations. The antenna sheaths 152, 154 are generally parallel to a longitudinal axis of the main unit 52 when the accessory unit or specialized component 150 is attached to the main unit.

A first helical antenna 158 is mounted within the first antenna sheath and is generally aligned with its associated sheath. In similar fashion, a second helical antenna 160 is mounted within the second antenna sheath and is generally aligned with its associated sheath. The antennas 158, 160 may actually be integrally molded in the sheaths 152, 154. The first and second helical antennas 158, 160 are sufficiently spaced to avoid mutual effects.

First and second antenna feeds 162, 164 are provided so as to be in electrical continuity with the first and second helical antennas 158, 160, respectively, and are engageable with antenna interface 166 when the casing 156 is attached to the main unit 52. A control module 168 includes a matching circuit 170 in electrical continuity with the first and second helical antennas 158, 160 for operation, and antenna leads 172, 174 electrically connect the first and second helical antennas to the first and second antenna feeds, respectively.

This dual band antenna configuration is utilized when the same phone is intended to operate in more than one frequency band, for instance, 900 MHz and 1800 MHz bands. In such an instance, an antenna with dual resonance or a phone with two different antennas is needed. When antennas are coaxially constructed, they undesirably effect each other. The construction of this embodiment offers the ability to place antennas far away each other to thereby avoid mutual effects. As noted above, the matching circuit 170 enables such a dual antenna embodiment.

With continued reference to FIG. 15, another embodiment of the invention will now be described according to which the specialized component 150 provides antenna diversity. In certain cases it is advantageous for a radio telephone to select one of several antennas, each antenna having different reception and transmission characteristics. The best antenna at each given time can be selected according to the signals being received by the radio telephone and is switched automatically to the radio part of the mobile telephone. This principle is called antenna diversity. A typical system is disclosed in commonly assigned U.S. Pat. No. 5,276,920 to Kuisma.

The construction illustrated in FIG. 15 enables one to realize such antenna diversity because the antennas 158, 160 can be placed enough far away from each other to achieve the desired result. In this instance, a switching circuit 176 is provided for choosing the particular antenna to be operated. The switching circuit 176 obtains its power from the regulated power interface 178. Commands to switch between antennas are received from the data bus interface.

Figure 16:
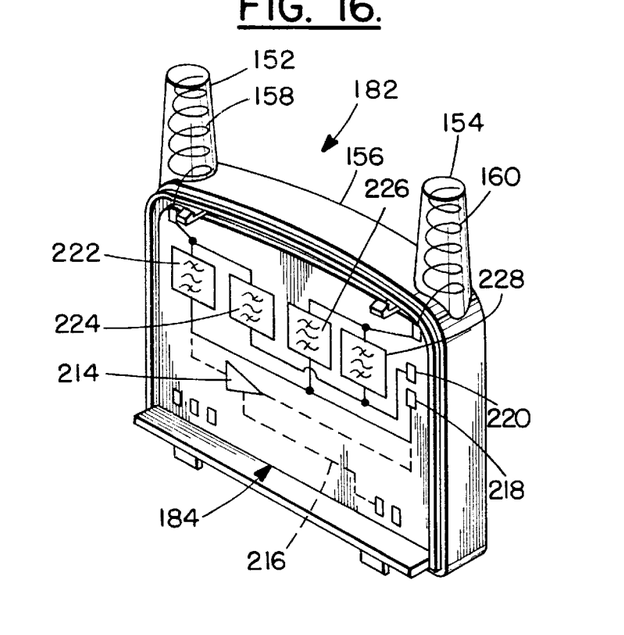
FIG. 16 is a detail perspective view of yet a further specialized component of the invention capable of removable attachment to the main body of the mobile telephone of the invention.

In FIG. 16, yet a further specialized component 182 is seen to include the modified casing 156 of the specialized component 150. In this instance, a filtering module 184, suitably mounted on the casing 156, is in electrical continuity with the control module 168 for filtering signals received by the first and second helical antennas and for filtering signals transmitted by those antennas. When using the dual band antenna accessory, specialized component 182, there is need to have filtering for received and transmitted signal next to the antennas. In the dual band embodiment of the invention, there is space for filtering and it is possible to place filters into the accessory unit. It is also possible to place the first amplifier stage, a low noise amplifier 214 (LNA) of the receiving path into the specialized component 182, specifically between the receive filtering and the receive port. It is advantageous that LNA 214 be physically near the antennas 152, 154 to avoid losses. This combination of antennas, first filtering and LNA being mutually in close proximity is ideal from a loss avoidance standpoint. FIG. 16 illustrates the filtering module 184 as including an LNA power lead 216, a receive port 218, a transmit port 220, a receive filtering (first band) circuit 222, a transmit filtering (first band) circuit 224, a receive filtering (second band) circuit 226, and a transmit filtering (second band) circuit 228.

An even more ideal arrangement would result if the transmitter were fitted in the module 184, although the added complication of such a design would have to be taken into consideration.

All of these antenna constructions just described have the further advantage that, in each instance, the specialized component positions the antenna(s) as far as possible from the head of the user. As a result, radiation towards the body (specifically, the head) is reduced and the shadowing effect of the head to the antenna is reduced.

Figure 17:
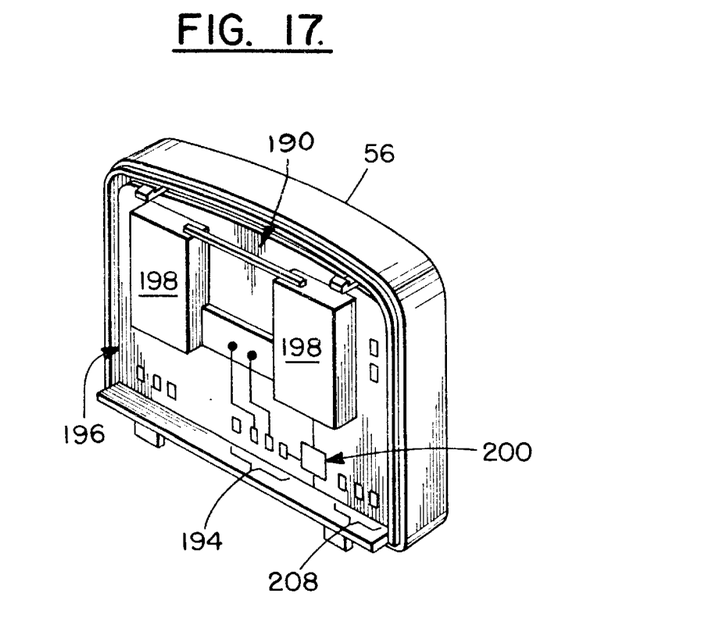
FIG. 17 is a detail perspective view of one more specialized component of the invention capable of removable attachment to the main body of the mobile telephone of the invention.
Figure 18:
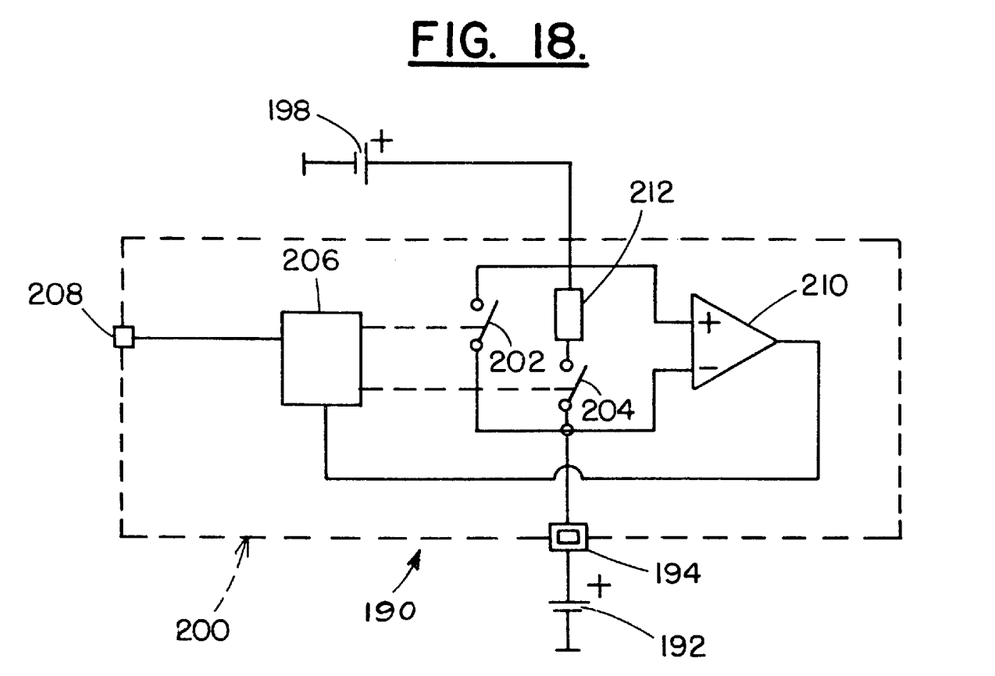
FIG. 18 is a diagrammatic view of an electronic circuit for operating the invention.

Turn now to FIGS. 17 and 18 for the description of another specialized component 190 providing an accessory battery pack. In keeping with this embodiment, the main unit 52 includes a main battery 192 (diagrammatically depicted in FIG. 18) for powering the mobile telephone 50 during normal usage. The main battery 192 is in electrical continuity with the battery power interface 66 of the main unit 52 and, therefore, with an accessory battery power interface 194 for the specialized component 190. The specialized component 190 includes an accessory battery module 196 suitably mounted on the casing 56. In turn, the module 196 includes an accessory battery 198 for powering the telephone when the main battery 192 has become discharged or is absent and a battery control module, or circuit, 200 (FIG. 18) for electrically connecting the accessory battery 198 to the battery power interface 66, 194 when the main battery 192 has become discharged or is absent. The control circuit 200 allows for the simultaneous charging of the main battery and said accessory battery and for preventing simultaneous discharging of the main battery and of the accessory battery.

The concept of this specialized component is to be like a "stand-by power plant." It is a small, external, low capacity, battery to supply the phone, for instance, during a battery pack change. Normally in digital telephone systems, if one replaces a discharged battery with a charged one, while a call is in process, the call is lost. This is very troublesome, for instance, when using data transfer, sending facsimiles, and the like. Also, a user is required to "boot" the phone after changing a battery, relate give passwords, and the like.

As seen in FIGS. 17 and 18, the battery power interface is parallel to main battery connector of the phone. The control module, or circuit, 200 is positioned between the battery power interface 66, 194 and the external accessory battery. There oftentimes occurs the need to charge the accessory battery 198 while charging the main battery 192 and to avoid discharging the accessory battery together with main battery. To this end, switches 202 and 204 are open, except during charging. The simplest way to control switches is for an accessory battery unit 206 to receive a charging command from the accessory data bus 208 which is in contact engagement with the phone data bus 64 and closes switch 202 during the charging operation.

Another way to control the states of batteries is disclosed in FIG. 18. A comparator 210 is employed to check the direction of current flow between the accessory battery 198 and the main battery 192. To check the direction of current flow, the switch 202 is opened and switch 204 is closed. Switch 202 can be any mechanical (relay) or electronic (FET) switch with low resistance. Current through switch 204 is limited by a resistance 212 so it can be a higher resistance switch.

If the voltage at the terminal of the accessory battery 198 is higher than at the terminal of the main battery 192, the accessory battery is discharging and if it is lower, the accessory battery is charging. If the charging state is recognized, the switch 202 can be switched on. Switch 202 can also be used to control the charging current of the accessory battery, for instance, to generate pulse charging by switching switch 202 on or off during the charging operation. Charging is also possible through the resistance 212 to limit current.

When the main battery 192 is removed, the switch 202 is closed and the phone 50 obtains its supply voltage from the accessory battery 198. There can be, for instance, a mechanical switch that opens when removing main battery (before disconnecting battery contacts), this information being transferred via the internal data bus 64, 208 to the control module 200 of the accessory battery.

One further advantage of this construction resides in the fact that with the specialized component 190, there is spare capacity, for instance, for placing a "911" call even if the main battery 192 is discharged.

It should also be considered as within the scope of the invention for the casing 56 to be equipped with more than one specialized component. For instance, it could be equipped with both a battery and an antenna if they could be accommodated by the space available.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A mobile telephone adaptable to a variety of specialized capabilities comprising:

a main unit having a contoured outer surface and including an operating system for operation of the mobile telephone;

an accessory unit including a casing having a contoured outer surface and containing specialized electronic component means, said casing being selectively releasably attachable to said main unit which, when attached to said main unit, generally conforms to said outer surface of said main unit and lies generally within the profile of said main unit when attached thereto;

interface means including an antenna interface on said main unit and on said accessory unit mutually engageable when said accessory unit is attached to said main unit for electrically interconnecting said specialized electronic component means with said operating system;

said specialized electronic component means including:

an antenna sheath integral with said casing projecting in a direction away from said outer surface thereof generally parallel to a longitudinal axis of said main unit when said accessory unit is attached thereto;

a helical antenna mounted within said antenna sheath and generally aligned therewith;

an antenna feed in electrical continuity with said helical antenna and engageable with said antenna interface when said casing is attached to said main unit;

an antenna lead electrically connecting said helical antenna to said antenna feed; and a retractable whip antenna concentrically aligned with said helical antenna and mounted on said casing for movement between a retracted position and an extended position, said whip antenna including a contact member disengaged from said antenna lead when said whip antenna is in the retracted position and engaged with said antenna lead when said whip antenna is in the extended position.

2. A mobile telephone as set forth in claim 1 wherein said interface means includes at least one of an internal data bus, a battery power interface, and a regulated power interface.

3. A mobile telephone as set forth in claim 1 wherein said specialized component means includes an alarm system for notifying the user of an occurring event.

4. A mobile telephone as set forth in claim 3 wherein said alarm system includes:
   a vibratory module fixed to said casing;
   an eccentric motor mounted on said vibratory module;
   motor control means for operating said eccentric motor; and
   lead means for electrically connecting said vibratory module to said interface means.

5. A mobile telephone as set forth in claim 1 including attachment means fixed on said outer surface of said casing for releasable attachment to an article of clothing worn by a user;
   wherein said attachment means includes:
      a post integral with and projecting away from said casing; and
      a peripheral flange on said post spaced from said casing for inter-engaging reception with a mounting clip on the article of clothing worn by the user.

6. A mobile telephone as set forth in claim 5 wherein said post has a central cavity adjacent said peripheral flange for reception therein of a protuberance on the mounting clip for normal retention of said post on the article of clothing worn by the user.

7. A mobile telephone as set forth in claim 1 wherein said main unit includes:
   a main battery for powering said mobile telephone during normal usage;
   wherein said interface means includes a battery power interface, said main battery being in electrical continuity with said battery power interface; and
   wherein said specialized component means includes:
      an accessory battery for powering said telephone when said main battery has become discharged or is absent; and
      battery control means for electrically connecting said accessory battery to said battery power interface when said main battery has become discharged or is absent.

8. A mobile telephone as set forth in claim 1 wherein said specialized component means includes:
   control means for simultaneously charging said main battery and said accessory battery and for preventing simultaneous discharging of said main battery and of said accessory battery.

9. An accessory unit for a mobile telephone having a main unit with a contoured outer surface and an operating system for operation thereof adaptable to a variety of specialized capabilities, said accessory unit comprising:
   a casing having a contoured outer surface;
   means for selectively releasably attaching said casing to the main unit of the telephone, said contoured outer surface of said casing generally conforming to the outer surface of the main unit and lies generally within the profile of the main unit when attached thereto;
   specialized electronic component means within said casing; and
   interface means including an antenna interface, an internal data bus, and a regulated power interface on said accessory unit mutually engageable with mating means of the operating system when said accessory unit is attached to the main unit for electrically interconnecting said specialized electronic component means with the operating system;
   said specialized electronic component means includes:
      first and second spaced antenna sheaths integral with said casing projecting in a direction away from said outer surface thereof at spaced locations, said antenna sheaths being generally parallel to a longitudinal axis of the main unit when said accessory unit is attached thereto;
      a first helical antenna mounted within said first antenna sheath and generally aligned therewith;
      a second helical antenna mounted within said second antenna sheath and generally aligned therewith;
      said first and second helical antennas being sufficiently spaced to avoid mutual effects;
      first and second antenna feeds in electrical continuity with said first and second helical antennas, respectively, and engageable with the antenna interface when said casing is attached to the main unit;
      a control module including switching circuit means in electrical continuity with said first and second helical antennas for selective operation, in sequence, of either said first helical antenna or said second antenna;
      an antenna lead electrically connecting said first and second helical antennas to said first and second antenna feeds, respectively;
      power supply feed engaged with the regulated power interface when said casing is attached to the main unit; and
      switching data feed engaged with the data interface when said casing is/

10. A mobile telephone as set forth in claim 9 wherein said interface means includes at least one of an antenna interface, an internal data bus, a battery power interface, and a regulated power interface.

11. A mobile telephone as set forth in claim 9 wherein said specialized component means includes an alarm system for notifying the user of an occurring event.

12. A mobile telephone as set forth in claim 9 wherein said alarm system includes:
   a vibratory module fixed to said casing;
   an eccentric motor mounted on said vibratory module;
   motor control means for operating said eccentric motor; and
   lead means for electrically connecting said vibratory module to said interface means.

13. A mobile telephone as set forth in claim 9 wherein said attachment means includes:
   a post integral with and projecting away from said casing; and
   a peripheral flange on said post spaced from said casing for inter-engaging reception with a mounting clip on the article of clothing worn by the user.

14. A mobile telephone as set forth in claim 13 wherein said post has a central cavity adjacent said peripheral flange for reception therein of a protuberance on the mounting clip for normal retention of said post on the article of clothing worn by the user.

15. A mobile telephone as set forth in claim 9 wherein said specialized component means includes:
   an accessory battery for powering the telephone when the main battery has become discharged or is absent; and
   battery control means for electrically connecting said accessory battery to the battery power interface when the main battery has become discharged or is absent.

16. A mobile telephone as set forth in claim 9 wherein said specialized component means includes:
control means for simultaneously charging the main battery and said accessory battery and for preventing simultaneous discharging of the main battery and of said accessory battery.

17. A mobile telephone adaptable to a variety of specialized capabilities comprising:
a main unit having a contoured outer surface and including an operating system for operation of the mobile telephone;
an accessory unit including a casing having a contoured outer surface, a length, a width, and a depth and containing specialized electronic component means, said casing being selectively releasably attachable to said main unit which, when attached to said main unit, generally conforms to said outer surface of said main unit and lies generally within the profile of said main unit when attached thereto; and
interface means including an antenna interface on said main unit and on said accessory unit mutually engageable when said accessory unit is attached to said main unit for electrically interconnecting said specialized electronic component means with said operating system;
said specialized electronic component means including:
a flat profile antenna mounted on said casing substantially coextensive with the length and width thereof;
a flat profile antenna feed in electrical continuity with said flat profile antenna but disengaged with said antenna interface when said casing is attached to said main unit;
a flat profile antenna lead electrically connecting said flat profile antenna to said antenna feed;
a retractable whip antenna mounted on said casing for movement between a retracted position and an extended position, said whip antenna including a first contact member in electrical continuity with said whip antenna and a second contact member on said whip antenna spaced from said first contact member and electrically insulated from said whip antenna;
a whip antenna feed spaced from said flat profile antenna feed and in electrical continuity with said whip antenna and engaged with said antenna interface when said casing is attached to said main unit; and
a whip antenna lead electrically connecting said whip antenna to said whip antenna feed;
said second contact member being in electrical continuity simultaneously with said whip antenna feed and with said flat profile antenna feed when said whip antenna is in the retracted position and said first contact member being in electrical continuity with said whip antenna feed alone when said whip antenna is in the extended position.

18. A mobile telephone adaptable to a variety of specialized capabilities comprising:
a main unit having a contoured outer surface and including an operating system for operation of the mobile telephone;
an accessory unit including a casing having a contoured outer surface and containing specialized electronic component means, said casing being selectively releasably attachable to said main unit which, when attached to said main unit, generally conforms to said outer surface of said main unit and lies generally within the profile of said main unit when attached thereto; and
interface means including an antenna interface on said main unit and on said accessory unit mutually engageable when said accessory unit is attached to said main unit for electrically interconnecting said specialized electronic component means with said operating system;
said specialized electronic component means including:
first and second spaced antenna sheaths integral with said casing projecting in a direction away from said outer surface thereof at spaced locations, said antenna sheaths being generally parallel to a longitudinal axis of said main unit when said accessory unit is attached thereto;
a first helical antenna mounted within said first antenna sheath and generally aligned therewith;
a second helical antenna mounted within said second antenna sheath and generally aligned therewith;
said first and second helical antennas being sufficiently spaced to avoid mutual effects;
first and second antenna feeds in electrical continuity with said first and second helical antennas, respectively, and engageable with said antenna interface when said casing is attached to said main unit;
a control module including matching circuit means in electrical continuity with said first and second helical antennas for operation; and
an antenna lead electrically connecting said first and second helical antennas to said first and second antenna feeds, respectively.

19. A mobile telephone as set forth in claim 18 including:
a filtering module in electrical continuity with said control module for filtering signals received by said first and second helical antennas and for filtering signals transmitted by said first and second helical antennas.

20. A mobile telephone adaptable to a variety of specialized capabilities comprising:
a main unit having a contoured outer surface and including an operating system for operation of the mobile telephone;
an accessory unit including a casing having a contoured outer surface and containing specialized electronic component means, said casing being selectively releasably attachable to said main unit which, when attached to said main unit, generally conforms to said outer surface of said main unit and lies generally within the profile of said main unit when attached thereto; and
interface means including an antenna interface on said main unit and on said accessory unit mutually engageable when said accessory unit is attached to said main unit for electrically interconnecting said specialized electronic component means with said operating system;
said specialized component means including:
first and second spaced antenna sheaths integral with said casing projecting in a direction away from said outer surface thereof at spaced locations, said antenna sheaths being generally parallel to a longitudinal axis of said main unit when said accessory unit is attached thereto;
a first helical antenna mounted within said first antenna sheath and generally aligned therewith;
a second helical antenna mounted within said second antenna sheath and generally aligned therewith;
said first and second helical antennas being sufficiently spaced to avoid mutual effects;
first and second antenna feeds in electrical continuity with said first and second helical antennas, respectively, and engageable with said antenna interface when said casing is attached to said main unit;

a control module including switching circuit means in electrical continuity with said first and second helical antennas for selective operation, in sequence, of either said first helical antenna or said second antenna; and an antenna lead electrically connecting said first and second helical antennas to said first and second antenna feeds, respectively.

21. An accessory unit for a mobile telephone having a main unit with a contoured outer surface and an operating system for operation thereof adaptable to a variety of specialized capabilities, said accessory unit comprising:

a casing having a contoured outer surface;

means for selectively releasably attaching said casing to the main unit of the telephone, said contoured outer surface of said casing generally conforming to the outer surface of the main unit and lies generally within the profile of the main unit when attached thereto;

specialized electronic component means within said casing; and interface means including an antenna interface on said accessory unit mutually engageable with mating means of the operating system when said accessory unit is attached to the main unit for electrically interconnecting said specialized electronic component means with the operating system;

said specialized component means including:

an antenna sheath integral with said casing projecting in a direction away from said outer surface thereof generally parallel to a longitudinal axis of the main unit when said accessory unit is attached thereto;

a helical antenna mounted within said antenna sheath and generally aligned therewith;

an antenna feed in electrical continuity with said helical antenna and engageable with the antenna interface when said casing is attached to the main unit;

an antenna lead electrically connecting said helical antenna to said antenna feed; and a retractable whip antenna concentrically aligned with said helical antenna and mounted on said casing for movement between a retracted position and an extended position, said whip antenna including a contact member disengaged from said antenna lead when said whip antenna is in the retracted position and engaged with said antenna lead when said whip antenna is in the extended position.

22. An accessory unit for a mobile telephone having a main unit with a contoured outer surface and an operating system for operation thereof adaptable to a variety of specialized capabilities, said accessory unit comprising:

a casing having a contoured outer surface, a length, a width, and a depth;

means for selectively releasably attaching said casing to the main unit of the telephone, said contoured outer surface of said casing generally conforming to the outer surface of the main unit and lies generally within the profile of the main unit when attached thereto;

specialized electronic component means within said casing;

interface means including an antenna interface on said accessory unit mutually engageable with mating means of the operating system when said accessory unit is attached to the main unit for electrically interconnecting said specialized electronic component means with the operating system;

said specialized component means including:

a flat profile antenna mounted on said casing substantially coextensive with the length and width thereof;

a flat profile antenna feed in electrical continuity with said flat profile antenna but disengaged with said antenna interface when said casing is attached to the main unit;

a flat profile antenna lead electrically connecting said flat profile antenna to said antenna feed;

a retractable whip antenna mounted on said casing for movement between a retracted position and an extended position, said whip antenna including a first contact member in electrical continuity with said whip antenna and a second contact member on said whip antenna spaced from said first contact member and electrically insulated from said whip antenna;

a whip antenna feed spaced from said flat profile antenna feed and in electrical continuity with said whip antenna and engaged with said antenna interface when said casing is attached to the main unit;

a whip antenna lead electrically connecting said whip antenna to said whip antenna feed; and said second contact member being in electrical continuity simultaneously with said whip antenna feed and with said flat profile antenna feed when said whip antenna is in the retracted position and said first contact member being in electrical continuity with said whip antenna feed alone when said whip antenna is in the extended position.

23. A mobile telephone as set forth in claim 22 including impedance transformer means for matching the impedance of each said antenna with its associated said antenna feed.

24. An accessory unit for a mobile telephone having a main unit with a contoured outer surface and an operating system for operation thereof adaptable to a variety of specialized capabilities, said accessory unit comprising:

a casing having a contoured outer surface;

means for selectively releasably attaching said casing to the main unit of the telephone, said contoured outer surface of said casing generally conforming to the outer surface of the main unit and lies generally within the profile of the main unit when attached thereto;

specialized electronic component means within said casing;

interface means including an antenna interface on said accessory unit mutually engageable with mating means of the operating system when said accessory unit is attached to the main unit for electrically interconnecting said specialized electronic component means with the operating system;

said specialized component means including:

first and second spaced antenna sheaths integral with said casing projecting in a direction away from said outer surface thereof at spaced locations, said antenna sheaths being generally parallel to a longitudinal axis of said main unit when said accessory unit is attached thereto;

a first helical antenna mounted within said first antenna sheath and generally aligned therewith;

a second helical antenna mounted within said second antenna sheath and generally aligned therewith;

said first and second helical antennas being sufficiently spaced to avoid mutual effects;

first and second antenna feeds in electrical continuity with said first and second helical antennas, respectively, and engageable with the antenna interface when said casing is attached to the main unit;

a control module including matching circuit means in electrical continuity with said first and second helical antennas for operation; and an antenna lead electrically connecting said first and second helical antennas to said first and second antenna feeds, respectively.

25. A mobile telephone as set forth in claim 24 including:

a filtering module in electrical continuity with said control module for filtering signals received by said first and second helical antennas and for filtering signals transmitted by said first and second helical antennas.

* * * * *

UNITED STATES PATENT AND TRADEMARK OFFICE
CERTIFICATE OF CORRECTION

PATENT NO.   : 5,918,189
DATED        : 6/29/99
INVENTOR(S)  : Kivela

It is certified that error appears in the above-identified patent and that said Letters Patent is hereby corrected as shown below:

IN THE CLAIMS:

In Column 14, line 33, after the word "is" insert --attached to the main unit.--. (Claim 9) and delete "/".

Signed and Sealed this

Fourth Day of January, 2000

Attest:

Attesting Officer

Acting Commissioner of Patents and Trademarks